(12) United States Patent
Wang et al.

(10) Patent No.: US 11,588,553 B2
(45) Date of Patent: Feb. 21, 2023

(54) END-TO-END CIRCUIT STITCHING (71) Applicant: FUJITSU LIMITED, Kawasaki (JP)

(72) Inventors: Xi Wang, Murphy, TX (US); Paparao Palacharla, Richardson, TX (US); John David Campochiaro, Plainville, CT (US)

(73) Assignee: FUJITSU LIMITED, Kawasaki (JP)

( * ) Notice: Subject to any disclaimer, the term of this patent is extended or adjusted under 35 U.S.C. 154(b) by 50 days.

(21) Appl. No.: 17/315,172

(22) Filed: May 7, 2021

(65) Prior Publication Data
US 2022/0360335 A1 Nov. 10, 2022

(51) Int. Cl.
*H04B 10/27* (2013.01)
(52) U.S. Cl.
CPC .................... *H04B 10/27* (2013.01)
(58) Field of Classification Search
CPC .......... H04B 10/27; H04L 45/02; H04L 45/46
See application file for complete search history.

(56) References Cited

U.S. PATENT DOCUMENTS

| | | | | |
|---|---|---|---|---|
| 8,599,685 B2 * | 12/2013 | Evans | ..................... | H04L 47/70 370/467 |
| 2012/0254376 A1 * | 10/2012 | Bumstead | ............. | H04L 49/253 709/220 |
| 2015/0124837 A1 * | 5/2015 | Saltsidis | ............. | H04L 41/0893 370/419 |
| 2016/0112310 A1 * | 4/2016 | Forbes, Jr. | .............. | H04L 45/72 370/389 |

* cited by examiner

*Primary Examiner* — Dzung D Tran
(74) *Attorney, Agent, or Firm* — Maschoff Brennan (57) ABSTRACT

Operations may include obtaining lists of inter-Network-Element connections (inter-NE connections) between connection points of different network elements included in a network and obtaining lists of internal connections of the network elements included in the list of inter-NE connections. The operations may also include generating, based on the lists of inter-NE connections and the lists of internal connections, a global list of connection points that correspond to the inter-NE connections and the internal connections. Moreover, the operations may include generating, based on the global list of connection points, a plurality of upstream connection chains and a plurality of downstream connection chains with respect to the internal connections. In addition, the operations may include generating a list of end-to-end circuits by combining the respective upstream connection chains and the respective downstream connection chains of each respective internal connection.

18 Claims, 5 Drawing Sheets

| NE Name | FROM | | | | TO | | | | |
|---|---|---|---|---|---|---|---|---|---|
| | Interface # | Unit | Port Number | Port Name | STS# | Interface # | Unit | Port Number | Port Name | STS# |
| NE2 | 7 | OC192 | 1 | FAC-1 | 18 | 10 | OC192 | 1 | FAC-1 | 26 |
| | 10 | OC192 | 1 | FAC-1 | 26 | 7 | OC192 | 1 | FAC-1 | 18 |
| | 7 | OC192 | 1 | FAC-1 | 97 | | | | | 1 |
| | 10 | OC192 | 1 | FAC-1 | 97 | 11 | OC48B | 1 | FAC-1 | 97 |
| | 11 | OC48B | 1 | FAC-1 | 1 | 7 | OC192 | 1 | FAC-1 | 97 |
| | 11 | OC48B | 1 | FAC-1 | 1 | 10 | OC192 | 1 | FAC-1 | 97 |
| | 7 | OC192 | 1 | FAC-1 | 152 | | | | | 17 |
| | 10 | OC192 | 1 | FAC-1 | 152 | 11 | OC48B | 1 | FAC-1 | 17 |
| | 11 | OC48B | 1 | FAC-1 | 17 | 7 | OC192 | 1 | FAC-1 | 152 |
| | 11 | OC48B | 1 | FAC-1 | 17 | 10 | OC192 | 1 | FAC-1 | 152 |
| | 7 | OC192 | 1 | FAC-1 | 63 | | | | | 14 |
| | 10 | OC192 | 1 | FAC-1 | 41 | 11 | OC48B | 1 | FAC-1 | 14 |
| | 11 | OC48B | 1 | FAC-1 | 14 | 7 | OC192 | 1 | FAC-1 | 63 |
| | 11 | OC48B | 1 | FAC-1 | 14 | 10 | OC182 | 1 | FAC-1 | 41 |

END-TO-END CIRCUIT STITCHING

FIELD

The embodiments discussed in the present disclosure are related to end-to-end circuit stitching.

BACKGROUND

Optical networks are currently being migrated away from using time division multiplexing (TDM) technologies such as Synchronous Optical Networking (SONET) and Synchronous Digital Hierarchy (SDH) to other technologies. For example, optical networks are being migrated to using wavelength-division multiplexing (WDM) technologies such as Optical Transport Networks (OTN).

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

Operations may include obtaining lists of inter-Network-Element connections (inter-NE connections) between connection points of different network elements included in a network. The operations may also include obtaining lists of internal connections of the network elements included in the list of inter-NE connections, each list of internal connections corresponding to a respective network element and indicating connections within the respective network element. The operations may also include generating, based on the lists of inter-NE connections and the lists of internal connections, a global list of connection points that correspond to the inter-NE connections and the internal connections, the global list including indications with respect to each respective connection point. The indications may include to which network element the respective connection point corresponds, whether the respective connection point is an input connection point or an output connection point; and a set of associated connections that correspond to the respective connection point. Moreover, the operations may include generating, based on the global list of connection points, a plurality of upstream connection chains in which each upstream connection chain is determined for a respective internal connection that has at least one upstream connection. Further, the operations may include generating, based on the global list of connection points, a plurality of downstream connection chains in which each downstream connection chain is determined for a respective internal connection that has at least one downstream connection. In addition, the operations may include generating a list of end-to-end circuits by combining the respective upstream connection chains and the respective downstream connection chains of each respective internal connection. Each end-to-end circuit of the list may indicate a respective chain of inter-NE and internal connections from a respective first terminal connection point to a respective second terminal connection point. The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Optical networks are being updated with newer technologies to help support increased amounts of data that are communicated thereon. For example, optical networks are currently being migrated away from using time division multiplexing (TDM) technologies such as Synchronous Optical Networking (SONET) and Synchronous Digital Hierarchy (SDH) to wavelength-division multiplexing (WDM) technologies such as Optical Transport Networks (OTN).

The updating may include migrating all the communication circuits that include equipment that is based on older technologies to new equipment that is based on newer technologies. In order to successfully perform such a migration, having accurate information regarding which end-to-end circuits employ the older technologies. For example, accurate reports of end-to-end circuits that rely on older technologies may be needed. However, obtaining such information directly from network operators may be difficult or impossible.

For example, operators themselves may not have a complete, accurate, and/or up-to-date rendering of their corresponding systems. Additionally or alternatively, end-to-end circuits may include components or elements managed by different operators such that no one operator may have all the information needed to identify the end-to-end circuits. In the present disclosure, reference to an "end-to-end circuit" may include a series of connections between a first network element of an optical network and a second network element of the optical network including between one or more intermediary network elements that may be between the first network element and the second network element. The connections may include the media via which optical signals may propagate between the network elements.

According to one or more embodiments of the present disclosure, a computing system may be configured to perform automated end-to-end circuit stitching. As described in further detail below, the computing system may be configured to obtain one or more lists of inter-Network-Element (inter-NE) connections between connection points of different network elements of an optical network. Additionally, the computing system may be configured to obtain one or more lists of internal connections of the respective network elements. The internal connections may be connections within the respective network elements that are between the connection points of the respective network elements. As detailed below, based on the inter-NE connections and the internal connections, the computing system may be configured to populate missing information to help complete the lists. Further, the computing system may be configured to perform operations to identify end-to-end circuits based on the obtained lists.

The embodiments described herein may improve computing systems by providing a manner in which computing system are able to perform end-to-end circuit stitching. Further, the embodiments described herein may help improve optical networks by providing a mechanism to better identify end-to-end circuits of the optical networks that may include components that may be upgraded to newer technologies, which may improve the capabilities of the optical networks. Further, the operations performed by the computing system as described in the present disclosure may be with respect to such a large number of connections, connection points, and network elements that a human would not be able to perform the end-to-end stitching in the manner and scope that the computing system is able to. As such, the embodiments described in the present disclosure improve the technological field of computing systems and the upgrading of optical networks by causing computing systems to perform specific operations that allow for the computing systems to help improve optical networks.

Embodiments of the present disclosure are explained with reference to the accompanying drawings.

Figure 1A:
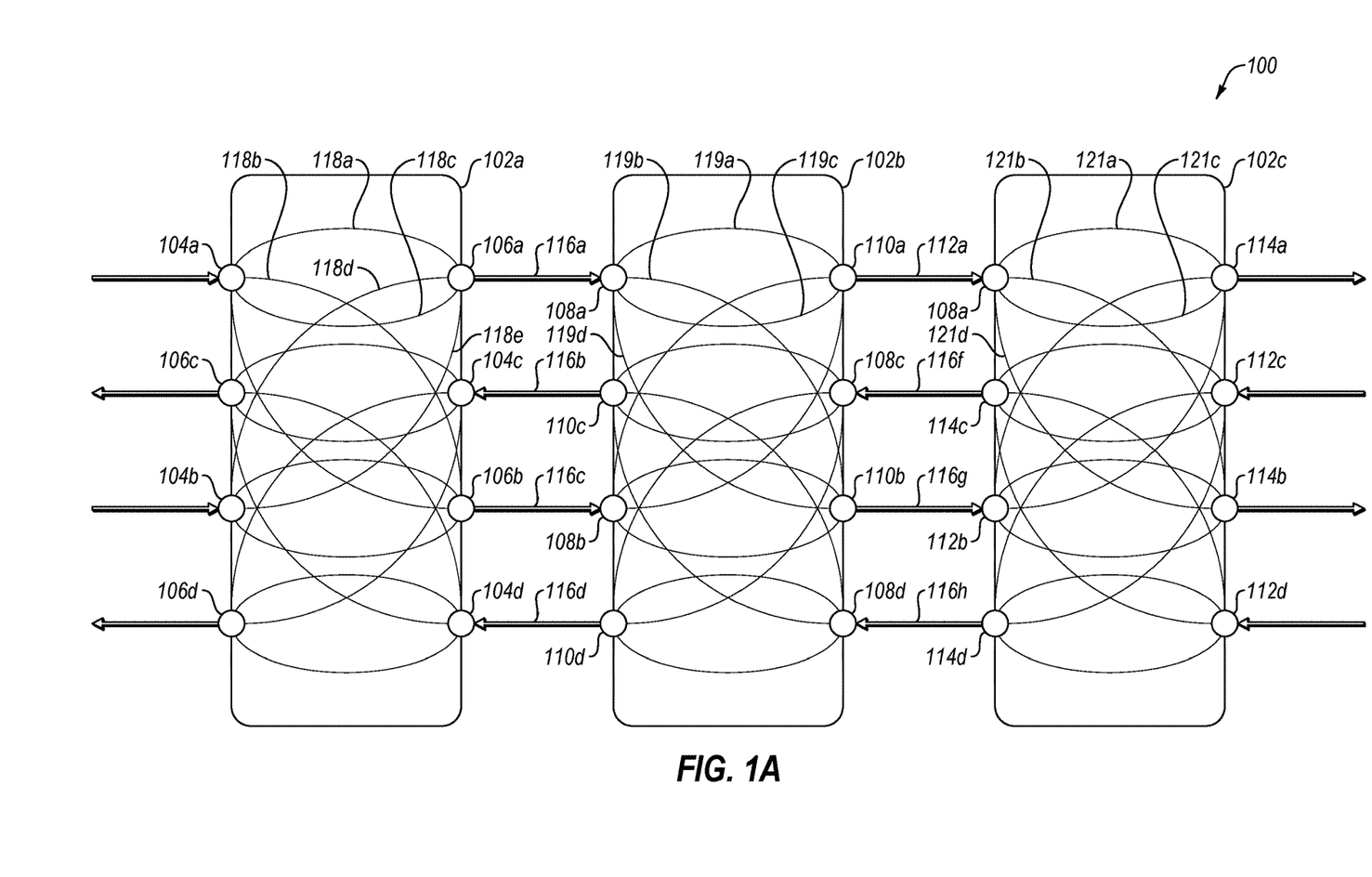
FIG. 1A is a diagram representing an example environment related to end-to-end circuit stitching.

FIG. 1A is a diagram representing an example network 100 related to end-to-end circuit stitching, arranged in accordance with at least one embodiment described in the present disclosure. The network 100 may be a portion of an optical network in some embodiments. The optical network may include any suitable optical network including a point-to-point optical network with terminal nodes, a ring optical network, a mesh optical network, or any other suitable optical network or combination of optical networks.

The network 100 may include a first network element 102a, a second network element 102b, and a third network element 102c (collectively or generally referred to as "network elements 102"). The network elements 102 may be nodes of the network 100. In some embodiments, the network elements 102 may be configured according to TDM technologies.

The network elements 102 may each include one or more connection points. In these or other embodiments, the connection points may be input connection points or output connection points with respect to certain inter-NE connections. For example, the first network element 102a may include connection points 104a, 104b, 104c, and 104d that may operate as input connection points in the illustrated example of FIG. 1A. Further, the first network element 102a may include connection points 106a, 106b, 106c, and 106d that may operate as output connection points in the illustrated example of FIG. 1A. Similarly, the second network element 102b may include connection points 108a, 108b, 108c, and 108d that may operate as input connection points in the illustrated example of FIG. 1A and may include connection points 110a, 110b, 110c, and 110d that may operate as output connection points in the illustrated example of FIG. 1A. In addition, the third network element 102c may include connection points 112a, 112b, 112c, and 112d that may operate as input connection points in the illustrated example of FIG. 1A and may include connection points 114a, 114b, 114c, and 114d that may operate as input connection points in the illustrated example of FIG. 1A.

The network elements 102 may be connected to each other via inter-NE connections 116 between respective input connection points and output connection points of the network elements 102. For example, the first network element 102a may be connected to the second network element 102b via an inter-NE connection 116a between the output connection point 106a of the first network element 102a and the first input connection point 108a of the second network element 102b. In the illustrated example, the first network element 102a may be connected to the second network element 102b via inter-NE connections 116b, 116c, and 116d as illustrated in FIG. 1A as well. Further, in the illustrated example, the second network element 102b may be connected to the third network element 102c via inter-NE connections 116e, 116f, 116g, and 116h, such as illustrated in FIG. 1. The inter-NE connections 116 in FIG. 1A are merely examples such that the number of inter-NE connections 116 between network elements 102 and the connection points that correspond to the different inter-NE connections 116 may vary.

The respective input and output connection points of the network elements 102 may also be connected to each other via internal connections, such as illustrated in FIG. 1A. For example, the input connection point 104a and the output connection point 106a of the first network element 102a may be connected to each other via internal connections 118a and 118c. Further, the input connection point 104a and the output connection point 106b may be connected to each other via an internal connection point 118b. The other respective connection points of the first network element 102a, the second network element 102b, and the third network element 102c may be connected via other internal connections, such as illustrated in FIG. 1A. The internal connections in FIG. 1A are merely examples such that the number of internal connections between different connection points and the different connection points that correspond to the different internal connections connect may vary.

Figure 1B:
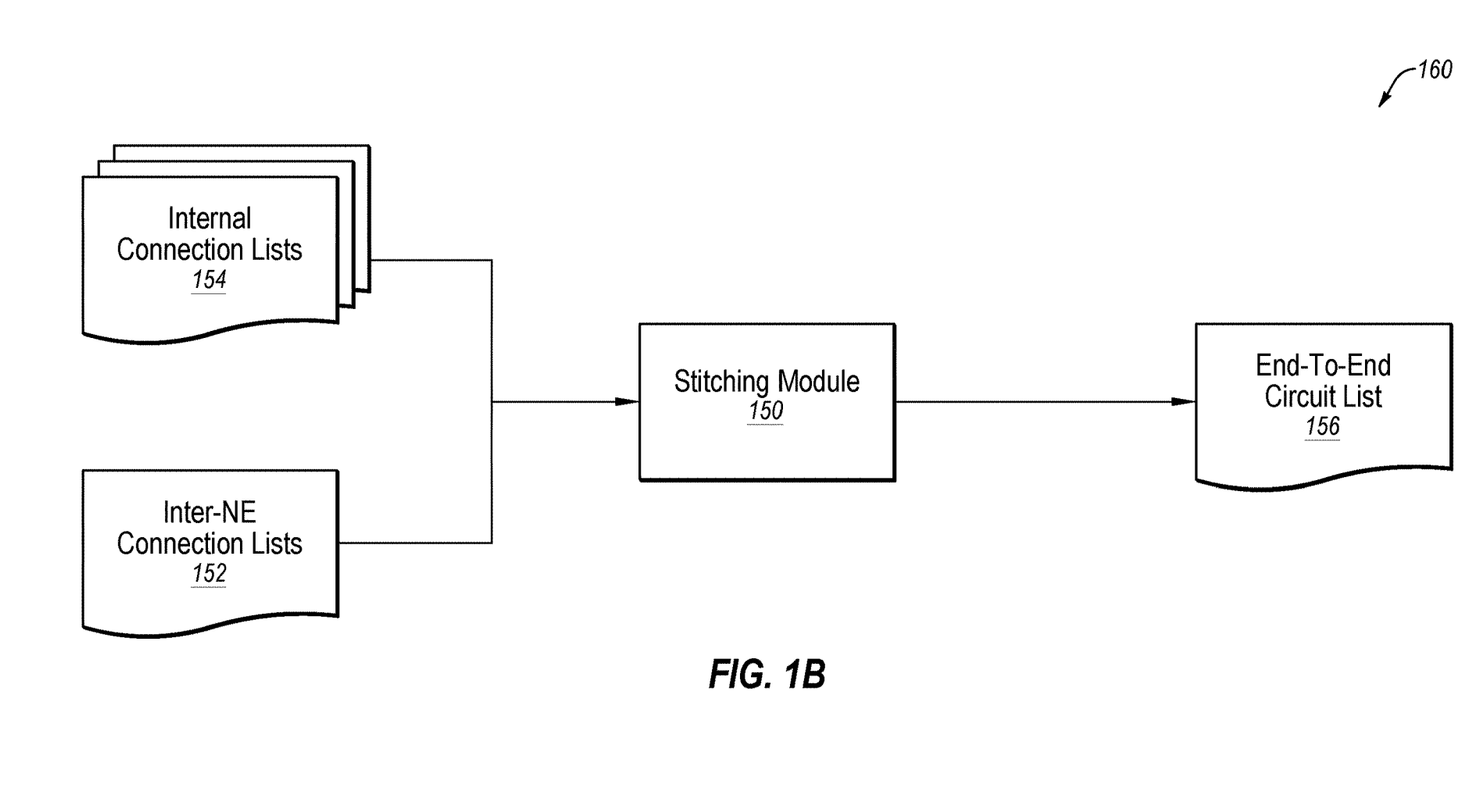
FIG. 1B illustrates an example environment that may be related to performing end-to-end circuit stitching.

FIG. 1B illustrates an example environment 160 that may be related to performing end-to-end circuit stitching, arranged in accordance with at least one embodiment described in the present disclosure. The environment 160 may include a stitching module 150 configured to generate an end-to-end circuit list 156 based on one or more inter-NE connection lists 152 and one or more internal connection lists 154. For explanatory purposes, the performance of end-to-end circuit stitching described with respect to environment 160 is described in the context of the network 100 of FIG. 1A. However, the circuit stitching operations described with respect to the environment 160 may be analogously applied to any applicable network and corresponding network elements.

The inter-NE connection lists 152 may include lists of the inter-NE connections 116 between the network elements 102. For example, the inter-NE connection lists 152 may include a first inter-NE connection list that corresponds to the first network element 102a. The first inter-NE connection list may indicate inter-NE connections 116 that correspond to the first network element 102a. For example, the first inter-NE connection list may include the inter-NE connections 116a, 116b, a116c, and 116d illustrated in FIG. 1A.

In these or other embodiments, the inter-NE connection lists 152 may include indications as to which connection points the inter-NE connections 116 correspond. For example, the first inter-NE connection list may indicate that the inter-NE connection 116a is between the output connection point 106a of the first network element 102a and the input connection point 108a of the second network element 102b. The first inter-NE connection list may include analogous indications with respect to the inter-NE connections 116b, 116c, and 116d. In some embodiments, the inter-NE connection lists 152 may include a second inter-NE connection list that corresponds to the second network element 102b and a third inter-NE connection list that corresponds to the third network element 102c. The second inter-NE connection list and the third inter-NE connection list may include analogous indications as the first inter-NE connection list with respect to the second network element 102b and the third network element 102c, respectively. In some embodiments, the inter-NE connection lists 152 may include a single list that includes the indications of the first inter-NE connection list, the second inter-NE connection list, and the third inter-NE connection list.

The internal connection lists 154 may include lists of the internal connections within the network elements 102 between the input connections and the output connections of the respective network elements 102. For example, the internal connection lists 154 may include a first internal connection list that corresponds to the first network element 102a. The first internal connection list may indicate the internal connections that correspond to the first network element 102a, such as the internal connections 118 illustrated in FIG. 1A (among others not explicitly labeled or described).

In these or other embodiments, internal connection lists 154 may include indications as to which connection points the internal connections correspond. For example, the first internal connection list may indicate that the internal connections 118a and 118c are between the input connection point 104a and the output connection point 106a of the first network element 102a. The first internal connection list may include analogous indications with respect to all of the other internal connections within the first network element 102a. In some embodiments, the internal connection lists 154 may include a second internal connection list that corresponds to the second network element 102b, which may include internal connections 119a, 119b, 119c, and 119d illustrated in FIG. 1A, among other internal connections of the second network element 102b. In these or other embodiments, the internal connection lists 154 may include a third internal connection list that corresponds to the third network element 102c, which may include internal connections 121a, 121b, 121c, and 121d, illustrated in FIG. 1A, among other internal connections of the third network element 102c. The second internal connection list and the third internal connection list may include analogous indications as the first internal connection list with respect to the internal connections of the second network element 102b and the third network element 102c, respectively. In some embodiments, the internal connection lists 154 may include a single list that includes the indications of the first internal connection list, the second internal connection list, and the third internal connection list.

The stitching module 150 may include code and routines configured to enable a computing system to perform one or more operations. Additionally or alternatively, the stitching module 150 may be implemented using hardware including a processor, a microprocessor (e.g., to perform or control performance of one or more operations), a field-programmable gate array (FPGA), or an application-specific integrated circuit (ASIC). In some other instances, the stitching module 150 may be implemented using a combination of hardware and software. In the present disclosure, operations described as being performed by the stitching module 150 may include operations that the stitching module 150 may direct a corresponding system to perform. As indicated above, the stitching module 150 may be configured to perform a series of operations with respect to the inter-NE connection lists 152 and the internal connection lists 154 to generate the end-to-end circuit list 156.

In some embodiments, the stitching module 150 may be configured to obtain the inter-NE connection lists 152 and the internal connection lists 154. In these or other embodiments, the stitching module 150 may be configured to identify missing entries that may be included in the internal connection lists 154. Additionally or alternatively, the stitching module 150 may be configured to infer information from the internal connection lists 154 to populate one or more of the missing entries.

Figure 1C:
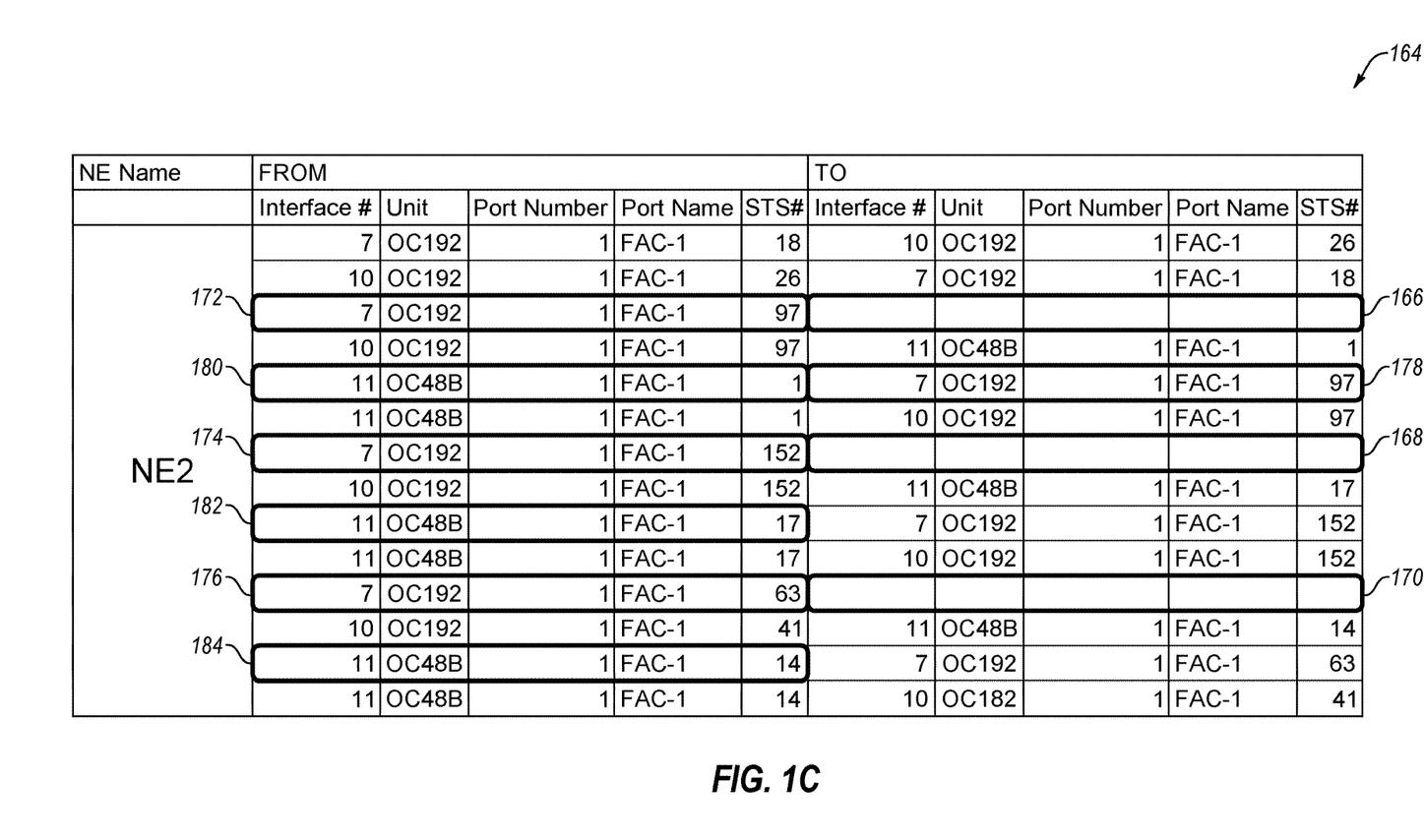
FIG. 1C illustrates an example internal connection list.

For example, FIG. 1C illustrates an example internal connection list 164 (list 164) of the second network element 102b. The list 164 may include missing entries 166, 168, and 170. In some embodiments, the stitching module 150 may be configured to obtain information from the list 164 to populate the missing entries 166 and 168.

For example, the stitching module 150 may be configured to identify complement entries in the list 164 that may correspond to the missing entries. The complement entries may be entries that indicate the connection elements that are on the other side of the connection that corresponds to the missing entry. For instance, each of the missing entries 166, 168, and 170 are associated with a "TO" field of the list 164 indicating that the missing entries are with respect to destination connection points of the connection elements that correspond to the internal connections having missing entries. In some embodiments, the stitching module 150 may be configured to identify respective "FROM" entries that are complement entries of the respective missing entries. For instance, the stitching module 150 may be configured to identify a "FROM" entry 172 that corresponds to the missing entry 166 as a complement entry of the missing entry 166; identify a "FROM" entry 174 that corresponds to the missing entry 168 as a complement entry of the missing entry 168, and identify a "FROM" entry 176 that corresponds to the missing entry 170 as a complement entry of the missing entry 170.

In these or other embodiments, the stitching module 150 may be configured to search for a reverse entry that corresponds to a respective identified complement entry. The reverse entry may be an entry in the opposite location of the identified complement entry that satisfies a matching threshold with respect to the complement entry.

For example, the complement entries 172, 174, and 176 are each "FROM" entries such that the stitching module 150 may be configured to search for a corresponding reverse entry in the "TO" field that includes a threshold number of matching values with a respective complement entry. In these or other embodiments, the stitching module 150 may be configured to prioritize certain types of values of the entries for matching over other values. For example, values that indicate specific connection elements associated with the connections may be prioritized for matching. Such values may include, for example, to which interface of the second network element 102b the internal connection corresponds (e.g., interface #), in which port hole the slot is disposed (e.g., port #), and/or a channel that is associated with the internal connection (e.g., the synchronous transport signal (STS) #).

In these or other embodiments, the complement entries of the identified reverse entries may be used to identify the missing values of the missing entries. For example, to identify the missing values for the missing entry 166, the stitching module 150 may be configured to search for a reverse entry of the identified complement entry 172. For instance, the stitching module 150 may be configured to look for "TO" entries in the "TO" field that include an interface #7, a port #1, and/or an STS #97 based on the complement entry 172 being a "FROM" entry and including such values. Based on such criteria, the stitching module 150 may identify a "TO" entry 178 that matches the "FROM" entry 172, and accordingly may identify the "TO" entry as a reverse entry of the "FROM" entry 172. In these or other embodiments, the stitching module 150 may be configured to identify a "FROM" entry 180 that corresponds to the identified "TO" entry 178 as a complement entry of the "TO" entry 178. The stitching module 150 may use the values of the "FROM" entry 180 to populate the missing entry 166. Note that the "FROM" entry 180 may also be considered a reverse entry of the missing entry 166.

The stitching module 150 may be configured to perform analogous operations with respect to the missing entries 168 and 170. For example, performing analogous operations, the stitching module 150 may be configured to populate the missing entry 168 with values from an entry 182. Additionally or alternatively, performing analogous operations, the stitching module 150 may be configured to populate the missing entry 170 with values from an entry 184.

Returning to FIG. 1B, the stitching module 150 may be configured to perform operations similar or analogous to those described above with respect to any number of missing entries of any number of the internal connection lists 154. The stitching module 150 may accordingly be configured to solve a problem associated with end-to-end circuit stitching by helping complete one or more incomplete internal connections lists, which may help in identification of a chain of linked connections of a corresponding network circuit.

The stitching module 150 may be configured to generate a global list of connection points using the inter-NE connection lists 152 and the internal connection lists 154. The global list of connection points may be formatted such that each connection point associated with a respective connection may be uniquely identified using a universal identification nomenclature. As such, the global list may help solve issues related to the inter-NE connection lists 152 and the internal connection lists 154 not being correlated with each other.

The global list may include indications with respect to each respective connection point of each respective connection. For example, the global list may include an indication as to which network element each respective connection point corresponds, whether the respective connection point is an input connection point or an output connection point, and a set of associated connections that correspond to the respective connection point. In these or other embodiments, the global list may include one or more additional indications with respect to each connection point in which the one or more additional indications may include a slot number and/or a port number that corresponds to the connection point.

By way of example, using the entry 172 of the connection list 164 of FIG. 1C, the stitching module 150 may identify an input connection point that corresponds to an STS #97 of an Interface #7 of a Port #1 of the second network element 102b of FIG. 1B. The connection point may be identified as an input connection point in that the entry 172 is a "FROM" entry of an internal connection meaning that the corresponding connection point is a "source" point with respect to the corresponding internal connection and a "destination" point with respect to a corresponding inter-NE connection, and thus is an input connection point of the second network element 102b.

As another example, using the entry 178 of the connection list 164 of FIG. 1C, the stitching module 150 may identify an output connection point that corresponds to the STS #97 of the Interface #7 of the Port #1 of the second network element 102b of FIG. 1B. The connection point may be identified as an output connection point in that the entry 178 is a "TO" entry of an internal connection meaning that the corresponding connection point is a "destination" point with respect to the corresponding internal connection and a "source" point with respect to a corresponding inter-NE connection, and thus is an output connection point of the second network element 102b. Note that in the examples given, an input connection point and an output connection point each correspond to the same STS number, interface number, and port number.

In some embodiments, the entries of the connection points included in the global list may be formatted as follows: neName.slotNum.portNum.IO, neName.slotNum.IO, or neName.IO. In these or other embodiments, "neName" may refer to a name of the network element to which the respective connection point corresponds, "slotNum" may refer to the slot number to which the respective connection point corresponds, "portNum" may refer to the port number to which the respective connection point corresponds, and "I" may be used to indicate that the respective connection point is an input connection point and "O" may be used to indicate that the respective connection point is an output connection point.

For example, an entry in the global list for the input connection point identified from entry 172 of the list 164 of FIG. 1C may be entered as follows: NE2.07.01.I. Similarly, an entry in the global list for the output connection point identified from entry 178 of the list 164 of FIG. 1C may be entered as follows NE2.07.01.O.

As indicated above, in some embodiments, the global list may include an indication for each respective connection point included therein with respect to a set of associated connections for the respective connection point. Each set of associated connections may indicate all of the inter-NE connections and the internal connections that correspond to the respective connection point. For example, referring to FIG. 1A, associated connections of the connection point 106a of the first network element 102a may include internal connections 118a, 118c, 118d, and 118e, as well as the inter-NE connection 116a. In some embodiments, the stitching module 150 may be configured to determine the associated connections for each connection point by analyzing the entries of both the internal connection lists 154 and the inter-NE connection lists 152 that correspond to each respective connection point.

In these or other embodiments, the stitching module 150 may be configured to identify chains of connections that may constitute an end-to-end circuit based on the global list of connection points. For example, in some embodiments, the stitching module 150 may be configured to identify, based on the global list of connection points, sets of matching internal connections between respective neighboring network elements. Each set of matching internal connections may include internal connections of the respective network elements of the neighboring network elements that may be connected to each other via an inter-NE connection. In some embodiments, the stitching module 150 may be configured to identify the matching internal connections by cross-referencing associated connections included in the global list of connection points. In these or other embodiments, the stitching module 150 may be configured to identify which of the matching connections are upstream connections or downstream connections with respect to each other.

For example, referring to FIG. 1A, the global list may indicate that the internal connections 118a, 118b, 118c, and 118*d* of the first network element 102*a* and the inter-NE connection 116*a* correspond to the output connection point 106*a* of the first network element 102*a*. Further, the global list may indicate that the internal connections 119*a*, 119*b*, 119*c*, and 119*d* of the second network element 102*b* and the inter-NE connection 116*a* correspond to the input connection point 108*a* of the second network element 102*b*. In some embodiments, the stitching module 150 may identify from the respective associated connections of the output connection point 106*a* and the input connection point 108*a* that both the output connection point 106*a* and the input connection point 108*a* correspond to the inter-NE connection 116*a*. In response to this determination that both the output connection point 106*a* and the input connection point 108*a* correspond to the inter-NE connection 116*a*, the stitching module 150 may be configured to cross-reference the respective internal connections of the output connection point 106*a* and the input connection point 108*a* as a set of matching internal connections. For instance, the stitching module 150 may identify the internal connections 118*a*, 118*b*, 118*c*, and 118*d* of the first network element 102*a* and the internal connections 119*a*, 119*b*, 119*c*, and 119*d* of the second network element 102*b* as a set of matching internal connections through the cross-referencing.

In these or other embodiments, the cross-referencing may include identifying STS number matches between internal connections associated with connection points to identify matching internal connections. For example, the stitching module 150 may be configured to determine that the internal connection 118*a* associated with the output connection point 106*a* has a same destination STS number as a source STS number of the internal connection 119*a* associated with the input connection point 108*a*. Based on this cross-referenced information, the stitching module 150 may be configured to determine that the internal connection 118*a* and the internal connection 119*a* are matching internal connections. Additionally or alternatively, using this information, the stitching module 150 may determine that the internal connection 118*a* is an upstream connection with respect to the internal connection 119*a* and/or may conversely determine that the internal connection 119*a* is a downstream connection with respect to the internal connection 118*a*.

In these or other embodiments, the stitching module 150 may be configured to register internal connections that are identified as matching. For example, the registering may include annotating for each respective internal connection, which other internal connections are identified as matching the respective internal connection and whether the matching internal connection is an upstream connection or a downstream connection with respect to the respective internal connection. In some embodiments, the stitching module 150 may be configured to identify and register all respective matching sets of internal connections.

In these or other embodiments, the stitching module 150 may be configured to determine connection chains based on the identified and registered matching internal connections and the corresponding inter-NE connections. For example, the stitching module 150 may be configured to identify an upstream connection chain and/or a downstream connection chain with respect to a respective connection point based on the identified and registered matching connections.

For instance, referring to FIG. 1A, as indicated above the internal connections 118*a* and 119*a* may be identified and registered as a set of matching internal connections that are connected via the inter-NE connection 116*a*. Further, the internal connections 119*a* and 121*a* may also be identified and registered as a set of matching connections that are connected via the inter-NE connection 116*e*. In these or other embodiments, the internal connection 118*a* may be registered as an upstream connection with respect to the internal connection 119*a* and the internal connection 119*a* may be registered as an upstream connection with respect to the internal connection 121*a*. Additionally, the internal connection 119*a* may be registered as a downstream connection with respect to the internal connection 118*a* and the internal connection 121*a* may be registered as a downstream connection with respect to the internal connection 119*a*. Based on these registered connections, the internal connections 119*a* and 118*a* may be determined as being included in an upstream connection chain with respect to the internal connection 121*a*. Similarly, the internal connections 119*a* and 121*a* may be determined as being included in a downstream connection chain with respect to the internal connection 118*a*. Further, the internal connection 118*a* may be determined as being included in an upstream connection chain with respect to the internal connection 119*a* and the internal connection 121*a* may be determined as being included in a downstream connection chain with respect to the internal connection 119*a*.

In some embodiments, the stitching module 150 may be configured to recursively add upstream connections to the corresponding upstream connection chains for the respective internal connections using the matching connections as registered. Similarly, the stitching module 150 may be configured to recursively add downstream connections to the corresponding downstream connection chains for the respective internal connections using the matching connections as registered.

In these or other embodiments, the connection chains (e.g., upstream and/or downstream) may be generated until there are no more corresponding upstream or downstream connections to be added. In instances in which the terminal connection point (e.g., the first connection point of an upstream connection chain or the last connection point of a downstream connection chain) of a respective connection chain is included in a network element that may be retired, the moving through the matching internal connections may result in identifying the terminal connection point and corresponding network element in the corresponding chain.

However, in instances in which the terminal connection point of a respective connection chain is included in a network element that may use newer technology and that may not be retired, moving through the matching internal connections may not result in identifying the terminal connection point and corresponding network element in the corresponding chain. As such, in some embodiments, once a terminal connection point is potentially reached (as determined from the registered internal connections), it may be determined whether such a connection point is further connected to another connection point that belongs to a newer technology network element via an inter-NE connection, such as a peering connection. In these or other embodiments, in response to determining that a potential terminal connection point is connected to a newer technology network element connection point, the stitching module 150 may be configured to identify the corresponding newer technology network element connection point as the terminal connection point.

In some embodiments, the connection chains may be indicated by linking the internal connections and corresponding connection points and inter-NE connections. For example, an upstream connection chain with respect to the internal connection 121*a* may be indicated as follows: {104*a*, 118*a*, 106*a*→108*a*, 119*a*, 110*a*→112*a*, 121*a*}. As indicated, the upstream connection chain for a particular internal connection may begin at the identified starting connection point and may move through the upstream connections until reaching the particular internal connection. Downstream connection chains may be indicated in an analogous manner but in which the downstream connection chain for a particular internal connection may begin at the particular internal connection and may move through the downstream connections until reaching the identified last connection point of the downstream connection chain. In these or other embodiments, the connection point indications included in the connection chains may be formatted according to that used in the global list of connection points.

In these or other embodiments, the stitching module 150 may be configured to generate the end-to-end circuit list 156 ("list 156") based on the identified upstream connection chains and corresponding downstream connection chains. As indicated above, the end-to-end circuits of the list 156 may indicate the chains of connections (e.g., inter-NE connections and internal connections) that may be from one terminal connection point to another terminal connection point. The network elements and corresponding connections that form end-to-end circuits may be based on an older technology and accordingly may indicate the network elements and corresponding connections that may be updated.

In some embodiments, the stitching module 150 may generate the end-to-end circuits of the list 156 by combining upstream and downstream connection chains of the respective internal connections. For example, a respective end-to-end circuit of the list 156 may include the upstream connection chain of a respective internal connection combined with the downstream connection chain of the respective internal connection. In some embodiments, the upstream connection chains and corresponding downstream connection chains may be combined by the stitching module 150 performing a concatenation operation.

Additionally or alternatively, in some embodiments, the stitching module 150 may be configured to identify and remove duplicate end-to-end circuits. For example, a first end-to-end circuit that is generated for a first internal connection (e.g., the internal connection 119a of FIG. 1A) may be the same as a second end-to-end circuit that is generated for a second internal connection that is included in the first end-to-end circuit (e.g., the internal connection 121a of FIG. 1A. In these or other embodiments, the first end-to-end circuit or the second end-to-end circuit may be removed because they may be substantially the same.

Modifications, additions, or omissions may be made to FIGS. 1A-1C without departing from the scope of the present disclosure. For example, the environments depicted therein may include more or fewer elements than those illustrated and described in the present disclosure. For example, the number of connections, configuration of connections, number of network elements, configuration of network elements, number of connection points, etc., may vary without departing from the scope of the present disclosure.

Figure 2:
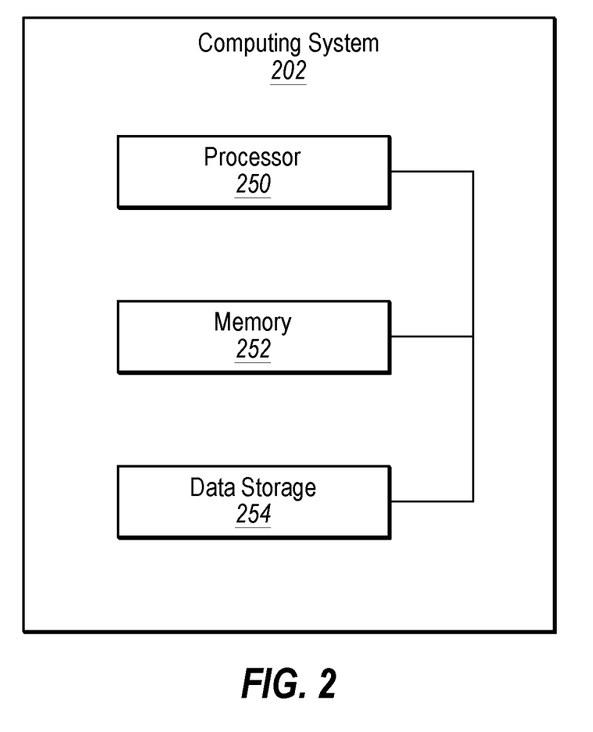
FIG. 2 illustrates a block diagram of an example computing system that may be used to perform end-to-end circuit stitching.

FIG. 2 illustrates a block diagram of an example computing system 202 that may be used to identify end-to-end circuits, according to at least one embodiment of the present disclosure. The computing system 202 may be configured to implement or direct one or more operations associated with the stitching module 150 of FIG. 1B, in some embodiments. The computing system 202 may include a processor 250, a memory 252, and a data storage 254. The processor 250, the memory 252, and the data storage 254 may be communicatively coupled.

In general, the processor 250 may include any suitable special-purpose or general-purpose computer, computing entity, or processing device including various computer hardware or software modules and may be configured to execute instructions stored on any applicable computer-readable storage media. For example, the processor 250 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 250 may include any number of processors configured to, individually or collectively, perform or direct performance of any number of operations described in the present disclosure. Additionally, one or more of the processors may be present on one or more different electronic devices, such as different servers.

In some embodiments, the processor 250 may be configured to interpret and/or execute program instructions and/or process data stored in the memory 252, the data storage 254, or the memory 252 and the data storage 254. In some embodiments, the processor 250 may fetch program instructions from the data storage 254 and load the program instructions in the memory 252. After the program instructions are loaded into memory 252, the processor 250 may execute the program instructions.

For example, in some embodiments, the stitching module 150 of FIG. 1B may be included in the data storage 254 as program instructions. The processor 250 may fetch the program instructions of the stitching module 150 from the data storage 254 and may load the program instructions of the stitching module 150 in the memory 252. After the program instructions of the stitching module 150 are loaded into memory 252, the processor 250 may execute the program instructions such that the computing system 202 may implement the operations (e.g., perform the operations and/or cause performance of the operations) associated with the stitching module 150 as directed by the instructions.

The memory 252 and the data storage 254 may include computer-readable storage media for carrying or having computer-executable instructions or data structures stored thereon. Such computer-readable storage media may include any available media that may be accessed by a general-purpose or special-purpose computer, such as the processor 250. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 250 to perform a certain operation or group of operations.

Modifications, additions, or omissions may be made to the computing system 202 without departing from the scope of the present disclosure. For example, in some embodiments, the computing system 202 may include any number of other components that may not be explicitly illustrated or described.

Figure 3:
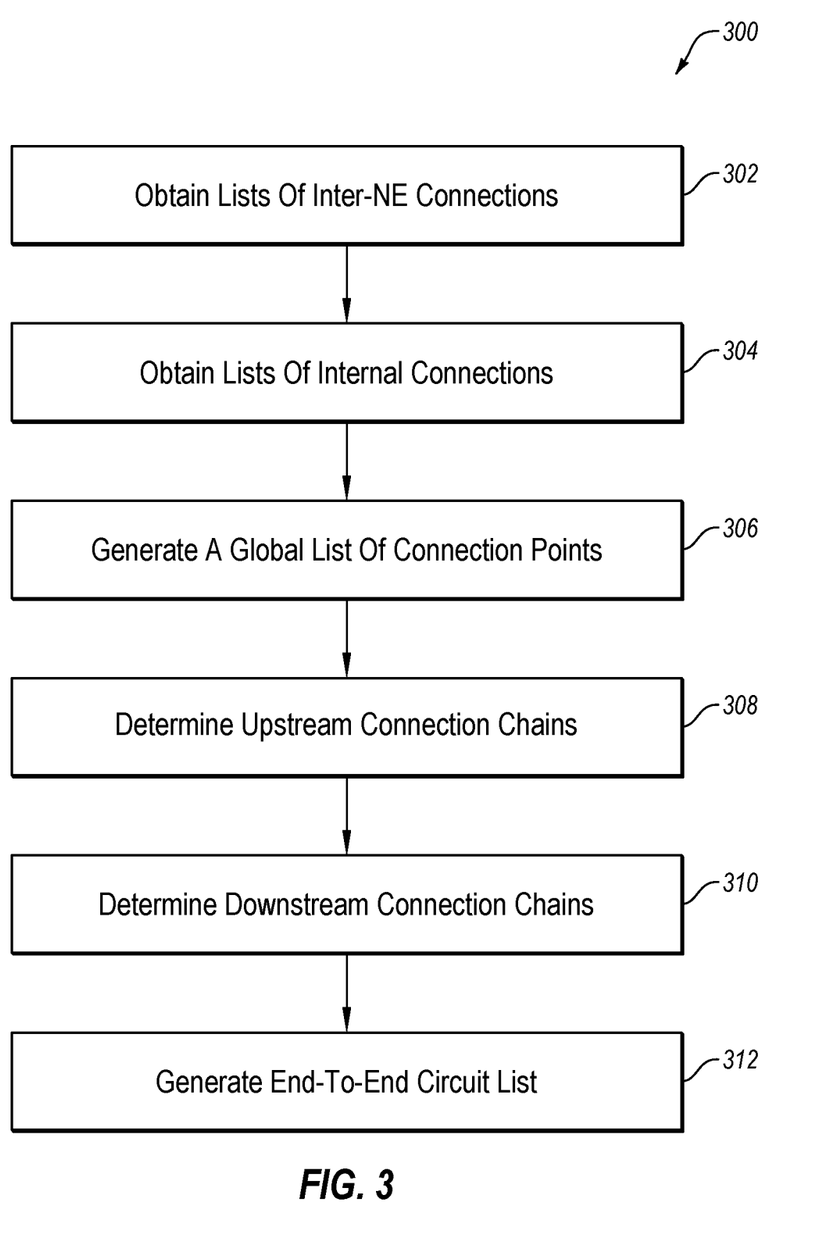
FIG. 3 is a flowchart of an example method of performing end-to-end circuit stitching.

FIG. 3 is a flowchart of an example method 300 of performing end-to-end circuit stitching, according to one or more embodiments of the present disclosure. The method 300 may be performed by any suitable system, apparatus, or device. By way of example, the stitching module 150 of FIG. 1B, or the computing system 202 of FIG. 2 (e.g., as directed by one or more modules in some embodiments) may perform one or more of the operations associated with the method 300. Although illustrated with discrete blocks, the steps and operations associated with one or more of the blocks of the method 300 may be divided into additional blocks, combined into fewer blocks, or eliminated, depending on the particular implementation.

At block 302, one or more lists of inter-NE connections between network elements may be obtained. For example, the inter-NE connection lists 152 of FIG. 1B are an example of the lists that may be obtained.

At block 304, one or more lists of internal connections of the network elements may be obtained. For example, the internal connection lists 154 of FIG. 1B are an example of the lists that may be obtained. As described above, in some embodiments, one or more missing entries of the internal connection lists may be populated. In these or other embodiments, the missing entries may be populated based on identified reverse entries of the missing entries, such as described above.

At block 306, a global list of connection points may be generated. The global list may be generated based on the obtained lists of inter-NE connections and internal connections, such as described above with respect to FIGS. 1A-1C. As described above, the global list may include indications with respect to each respective connection point included therein. The indications may include to which network element the respective connection point corresponds, whether the respective connection point is an input connection point or an output connection point, and a set of associated connections that correspond to the respective connection point.

In these or other embodiments, the respective sets of associated connections may be identified by identifying one or more internal connections that correspond to the respective connection points from the lists of internal connections. Additionally or alternatively, the respective sets of associated connections may be identified by identifying inter-NE connections that correspond to the respective connection points from the lists of inter-NE connections. The respective sets of associated connections may include the identified internal connections and inter-NE connections for the respective connection points.

At block 308, upstream connection chains may be generated for the internal connections. At block 310, downstream connection chains may also be generated for the internal connections. In some embodiments, the connection chains may be determined based on the global lists such as described above.

In these or other embodiments, the method 300 may include identifying sets of matching internal connections, such as described above. For example, the sets of matching internal connections may be identified by cross-referencing connection point indications included in the global list of connection points, such as described above. Additionally or alternatively, the connection chains may also be determined based on the sets of matching internal connections. In some embodiments, the generating of the upstream connection chains and of the downstream connection chains based on the matching internal connections may include recursively adding internal connections of sets of matching internal connections to a respective connection chain, as described above.

At block 312 one or more end-to-end circuits may be identified based on the connection chains. For example, the respective upstream connection chains and downstream connection chains of the internal connections may be combined to identify the end-to-end circuits. In these or other embodiments, the identified end-to-end circuits may be included in a list of end-to-end circuits. The list may be used to identify which components of a corresponding network that may be ready for replacement, such as described above.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments. In some embodiments, the method 300 may include additional blocks or fewer blocks.

As indicated above, the embodiments described in the present disclosure may include the use of a special purpose or general purpose computer (e.g., the processor 250 of FIG. 2) including various computer hardware or software modules, as discussed in greater detail below. Further, as indicated above, embodiments described in the present disclosure may be implemented using computer-readable media (e.g., the memory 252 or data storage 254 of FIG. 2) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B." This interpretation of the phrase "A or B" is still applicable even though the term "A and/or B" may be used at times to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
    obtaining lists of inter-Network-Element connections (inter-NE connections) between connection points of different network elements included in a network;
    obtaining lists of internal connections of the network elements included in the list of inter-NE connections, each list of internal connections corresponding to a respective network element and indicating connections within the respective network element;
    generating, based on the lists of inter-NE connections and the lists of internal connections, a global list of connection points that correspond to the inter-NE connections and the internal connections, the global list including indications with respect to each respective connection point, the indications including:
        to which network element the respective connection point corresponds;
        whether the respective connection point is an input connection point or an output connection point; and
        a set of associated connections that correspond to the respective connection point;
    identifying, based on the global list of connection points, one or more sets of matching internal connections between respective neighboring network elements that each include a first respective network element and a second respective network element, each set of matching internal connections indicating one or more first internal connections of the first respective network element that are connected to one or more second internal connections of the second respective network element in which the first internal connections are connected to the second internal connections via a corresponding inter-NE connection that connects a first connection point of the first respective network element to a second connection point of the second respective network element;
    generating, based on the global list of connection points and based on the one or more sets of matching internal connections, a plurality of upstream connection chains in which each upstream connection chain is determined for a respective internal connection that has at least one upstream connection;
    generating, based on the global list of connection points and based on the one or more sets of matching internal connections, a plurality of downstream connection chains in which each downstream connection chain is determined for a respective internal connection that has at least one downstream connection; and
    generating a list of end-to-end circuits by combining the respective upstream connection chains and the respective downstream connection chains of each respective internal connection, each end-to-end circuit of the list indicating a respective chain of inter-NE and internal connections from a respective first terminal connection point to a respective second terminal connection point.

2. The method of claim 1, further comprising:
    identifying one or more internal connections that correspond to the respective connection point from the lists of internal connections;
    identifying an inter-NE connection that corresponds to the respective connection point from the lists of inter-NE connections; and
    including the identified one or more internal connections and the identified inter-NE connection in the set of associated connections for the respective connection point.

3. The method of claim 1, wherein identifying the matching internal connections includes cross-referencing connection point indications included in the global list of connection points.

4. The method of claim 1, wherein the generating of the upstream connection chains and of the downstream connection chains based on the matching internal connections includes recursively adding internal connections of sets of matching internal connections to a respective connection chain.

5. The method of claim 1, further comprising populating missing entries of one or more lists of internal connections prior to generating the global list of connections points based on the lists of internal connections.

6. The method of claim 5, wherein populating the missing entries is based on reverse entries of the lists of internal connections that are respectively identified as corresponding to the missing entries.

7. The method of claim 1, wherein the end-to-end circuits are based on a first technology and identifying one or more of the respective first terminal connection points or identifying one or more of the respective second terminal connection points includes identifying a second technology connection point that is connected to a corresponding end-to-end circuit.

8. A system comprising:
one or more processors; and
one or more non-transitory computer-readable storage media configured to store instructions that, in response to being executed by the one or more processors, cause the system to perform operations, the operations comprising:
obtaining lists of inter-Network-Element connections (inter-NE connections) between connection points of different network elements included in a network;
obtaining lists of internal connections of the network elements included in the list of inter-NE connections, each list of internal connections corresponding to a respective network element and indicating connections within the respective network element, the obtaining of the lists of internal connections including populating missing entries of one or more lists of internal connections;
generating, based on the lists of inter-NE connections and the lists of internal connections, a global list of connection points that correspond to the inter-NE connections and the internal connections, the global list including indications with respect to each respective connection point, the indications including:
to which network element the respective connection point corresponds;
whether the respective connection point is an input connection point or an output connection point; and
a set of associated connections that correspond to the respective connection point;
generating, based on the global list of connection points, a plurality of upstream connection chains in which each upstream connection chain is determined for a respective internal connection that has at least one upstream connection;
generating, based on the global list of connection points, a plurality of downstream connection chains in which each downstream connection chain is determined for a respective internal connection that has at least one downstream connection; and
generating a list of end-to-end circuits by combining the respective upstream connection chains and the respective downstream connection chains of each respective internal connection, each end-to-end circuit of the list indicating a respective chain of inter-NE and internal connections from a respective first terminal connection point to a respective second terminal connection point.

9. The system of claim 8, the operations further comprising:
identifying one or more internal connections that correspond to the respective connection point from the lists of internal connections;
identifying an inter-NE connection that corresponds to the respective connection point from the lists of inter-NE connections; and
including the identified one or more internal connections and the identified inter-NE connection in the set of associated connections for the respective connection point.

10. The system of claim 8, the operations further comprising identifying, based on the global list of connection points, sets of matching internal connections between respective neighboring network elements that each include a first respective network element and a second respective network element, each set of matching internal connections indicating one or more first internal connections of the first respective network element that are connected to one or more second internal connections of the second respective network element in which the first internal connections are connected to the second internal connections via a corresponding inter-NE connection that connects a first connection point of the first respective network element to a second connection point of the second respective network element, wherein the generating of the plurality of upstream connection chains and of the plurality of downstream connection chains is further based on the matching internal connections that are identified based on the global list of connection points.

11. The system of claim 10, wherein:
identifying the matching internal connections includes cross-referencing connection point indications included in the global list of connection points; and
the generating of the upstream connection chains and of the downstream connection chains based on the matching internal connections includes recursively adding internal connections of sets of matching internal connections to a respective connection chain.

12. The system of claim 8, wherein populating the missing entries is based on reverse entries of the lists of internal connections that are respectively identified as corresponding to the missing entries.

13. The system of claim 8, wherein the end-to-end circuits are based on a first technology and identifying one or more of the respective first terminal connection points or identifying one or more of the respective second terminal connection points includes identifying a second technology connection point that is connected to a corresponding end-to-end circuit.

14. One or more non-transitory computer-readable storage media configured to store instructions that, in response to being executed, cause a system to perform operations, the operations comprising:
obtaining lists of inter-Network-Element connections (inter-NE connections) between connection points of different network elements included in a network;
obtaining lists of internal connections of the network elements included in the list of inter-NE connections, each list of internal connections corresponding to a respective network element and indicating connections within the respective network element, the obtaining of the lists of internal connections including populating missing entries of one or more lists of internal connections;
generating, based on the lists of inter-NE connections and the lists of internal connections, a global list of connection points that correspond to the inter-NE connections and the internal connections, the global list including indications with respect to each respective connection point, the indications including:
to which network element the respective connection point corresponds;
whether the respective connection point is an input connection point or an output connection point; and
a set of associated connections that correspond to the respective connection point;
generating, based on the global list of connection points, a plurality of upstream connection chains in which each upstream connection chain is determined for a respective internal connection that has at least one upstream connection;

generating, based on the global list of connection points, a plurality of downstream connection chains in which each downstream connection chain is determined for a respective internal connection that has at least one downstream connection; and generating a list of end-to-end circuits by combining the respective upstream connection chains and the respective downstream connection chains of each respective internal connection, each end-to-end circuit of the list indicating a respective chain of inter-NE and internal connections from a respective first terminal connection point to a respective second terminal connection point.

15. The one or more non-transitory computer-readable storage media of claim 14, the operations further comprising:
   identifying one or more internal connections that correspond to the respective connection point from the lists of internal connections;
   identifying an inter-NE connection that corresponds to the respective connection point from the lists of inter-NE connections; and
   including the identified one or more internal connections and the identified inter-NE connection in the set of associated connections for the respective connection point.

16. The one or more non-transitory computer-readable storage media of claim 14, the operations further comprising identifying, based on the global list of connection points, sets of matching internal connections between respective neighboring network elements that each include a first respective network element and a second respective network element, each set of matching internal connections indicating one or more first internal connections of the first respective network element that are connected to one or more second internal connections of the second respective network element in which the first internal connections are connected to the second internal connections via a corresponding inter-NE connection that connects a first connection point of the first respective network element to a second connection point of the second respective network element, wherein the generating of the plurality of upstream connection chains and of the plurality of downstream connection chains is further based on the matching internal connections that are identified based on the global list of connection points.

17. The one or more non-transitory computer-readable storage media of claim 16, wherein:
   identifying the matching internal connections includes cross-referencing connection point indications included in the global list of connection points; and
   the generating of the upstream connection chains and of the downstream connection chains based on the matching internal connections includes recursively adding internal connections of sets of matching internal connections to a respective connection chain.

18. The one or more non-transitory computer-readable storage media of claim 14, wherein populating the missing entries is based on reverse entries of the lists of internal connections that are respectively identified as corresponding to the missing entries.

* * * * *